United States Patent [19]

Steffen et al.

[11] Patent Number: 5,440,146

[45] Date of Patent: Aug. 8, 1995

[54] RADIOGRAPHIC IMAGE READER

[75] Inventors: James E. Steffen, Woodbury, Minn.; Jay A. Esch, River Falls, Wis.; Robert J. Mattila, Mahtomedi, Minn.; Eric J. Donaldson, St. Paul, Minn.; Timothy S. Vraa, Apple Valley, Minn.; Owen L. Nelson, St. Paul, Minn.; John E. Potts, Woodbury, Minn.; Jathan D. Edwards, Oakdale, Minn.; Kenneth J. Krepel, North St. Paul, Minn.; Joseph A. Hoffman, Minneapolis, Minn.

[73] Assignee: Minnesota Mining and Manufacturing Company, St. Paul, Minn.

[21] Appl. No.: 221,191

[22] Filed: Mar. 31, 1994

[51] Int. Cl.⁶ .................. G01N 23/04; G01T 1/24; G01G 13/00; G01G 15/00

[52] U.S. Cl. .................................. 250/580; 250/591

[58] Field of Search ................ 250/580, 584, 585, 591

[56] References Cited

U.S. PATENT DOCUMENTS

| | | |
|---|---|---|
| Re. 31,847 | 3/1985 | Luckey . |
| 3,650,620 | 3/1972 | Hoyt, III . |
| 3,675,014 | 7/1972 | Perl . |
| 3,827,072 | 7/1974 | Bevis et al. . |
| 3,898,722 | 8/1975 | Foote . |
| 4,126,788 | 11/1978 | Koontz et al. . |
| 4,176,275 | 11/1979 | Korn et al. . |
| 4,268,750 | 5/1981 | Cowart . |
| 4,426,724 | 1/1984 | Cutter . |
| 4,538,293 | 8/1985 | Cutter . |
| 4,553,369 | 11/1985 | Debes et al. . |
| 4,577,452 | 3/1986 | Hosel et al. . |
| 4,621,272 | 11/1986 | Toriumi et al. . |
| 4,675,984 | 6/1987 | Ohlson . |
| 4,760,641 | 8/1988 | Gandolfo . |
| 4,809,313 | 2/1989 | Gandolfo . |
| 4,823,372 | 4/1989 | Svendsen . |
| 4,827,136 | 5/1989 | Bishop, Jr. et al. . |
| 4,857,723 | 8/1989 | Modisette . |
| 4,870,285 | 9/1989 | Ohgoda . |
| 4,889,989 | 12/1989 | Yoshimura et al. . |
| 4,893,011 | 1/1990 | Bauer et al. . |
| 4,931,641 | 6/1990 | Ohgoda . |
| 4,961,209 | 10/1990 | Rowlands et al. . |
| 5,001,582 | 3/1991 | Numasaki . |
| 5,007,075 | 4/1991 | Mirlieb et al. . |
| 5,025,465 | 6/1991 | Bauer et al. . |
| 5,050,203 | 9/1991 | Mirlieb et al. . |
| 5,065,866 | 11/1991 | Boutet et al. . |
| 5,073,916 | 12/1991 | Mirlieb et al. . |
| 5,157,264 | 10/1992 | Kinanen et al. . |
| 5,168,160 | 12/1992 | Jeromin et al. . |
| 5,180,915 | 1/1993 | Ohgoda . |
| 5,268,569 | 12/1993 | Nelson et al. . |
| 5,268,950 | 12/1993 | Vogelgesang et al. . |
| 5,300,784 | 4/1994 | Fender et al. ................... 250/591 X |
| 5,354,982 | 10/1994 | Nelson et al. ................... 250/591 X |
| 5,381,014 | 1/1995 | Jeromin et al. ................. 250/580 X |

FOREIGN PATENT DOCUMENTS

| | | |
|---|---|---|
| 0522317A1 | 1/1993 | European Pat. Off. . |
| 0544138A2 | 6/1993 | European Pat. Off. . |
| WO91/16665 | 10/1991 | WIPO . |
| WO92/09925 | 6/1992 | WIPO . |

Primary Examiner—Constantine Hannaher
Assistant Examiner—Edward J. Glick
Attorney, Agent, or Firm—Gary L. Griswold; Walter N. Kirn; William K. Weimer

[57] ABSTRACT

A radiographic image reader acquires electronic signals corresponding to a latent image of an object produced by radiation exposure of a photoreceptive medium within a cassette. The radiographic image reader comprises a light-tight enclosure with at least one access port for inserting and removing the cassette. A scanner subsystem is mounted within the light-tight enclosure for scanning the photoreceptive medium within the cassette to initiate the acquisition of the electronic signals representative of the latent image. A cassette registration and interface subsystem within the light-tight enclosure comprises an electronic interface structure for electronically connecting the photoreceptive medium within the cassette to an electronic component external of the cassette to obtain the electronic signals corresponding to the latent image.

42 Claims, 9 Drawing Sheets

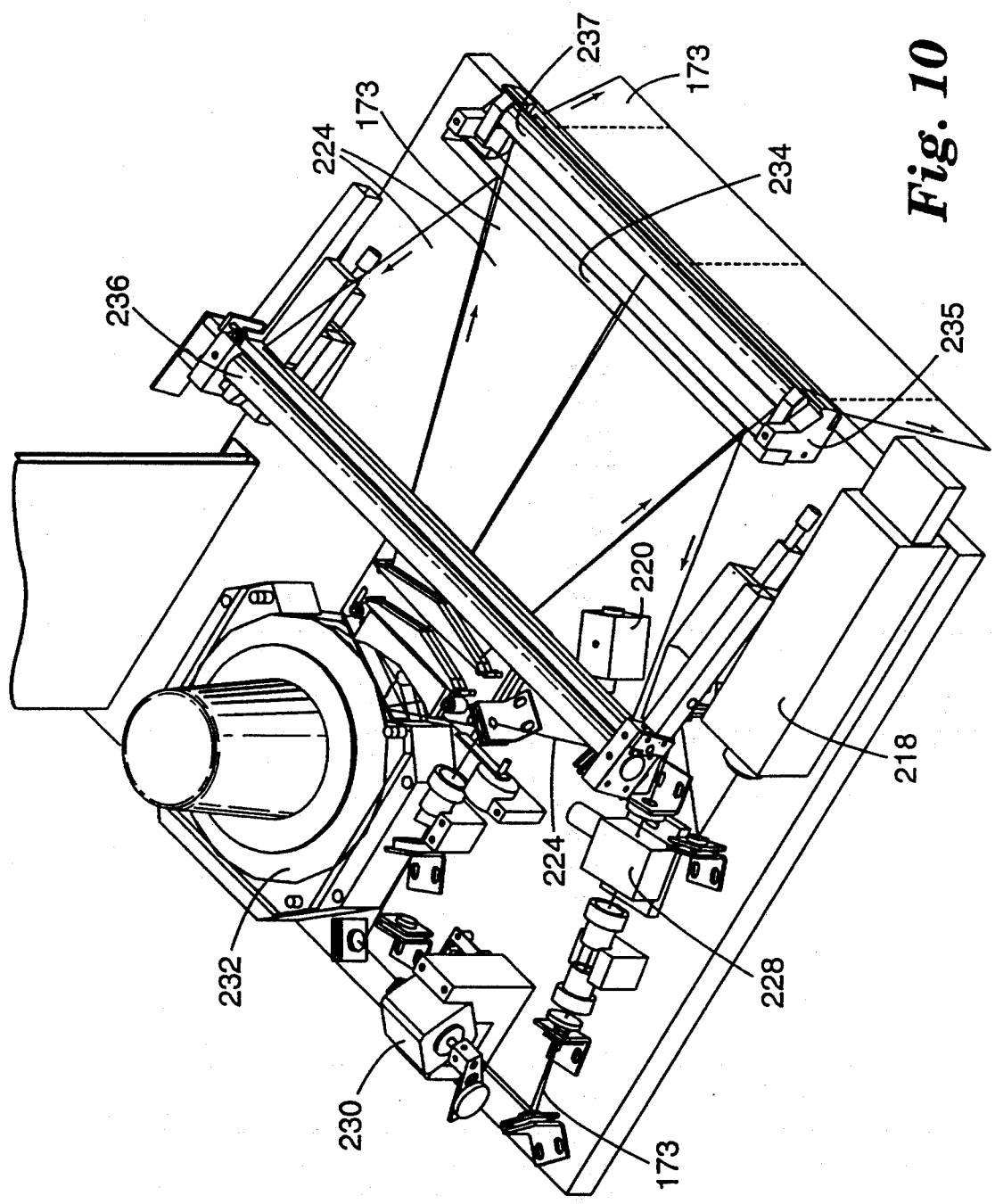

RADIOGRAPHIC IMAGE READER

FIELD OF THE INVENTION

The invention relates to radiographic imaging of objects and more particularly to an automated radiographic image reader for acquiring electronic signals corresponding to a latent image of an object produced by radiation exposure of a photoreceptive medium within a cassette.

BACKGROUND OF THE INVENTION

Conventional radiographic imaging, especially for use in medical diagnostics, has traditionally used silver halide based photographic films to capture shadow cast, or latent images of an object. Since silver halide has limited sensitivity to x-ray radiation, phosphor screens are typically used in conjunction with the photographic films in order to reduce the radiation dosage, which is of particular concern when the object being exposed is a person or animal. The films require a light-controlled environment throughout the film-handling process. The use of photographic film involves wet processing chemistry, the disposal of which has been identified as a significant environmental concern.

Electronic radiographic systems based on phosphor screens depend on detecting light emitted by the stimulable phosphor when externally stimulated by either heat or light. The emitted light is captured by a light detector, such as a photomultiplier tube, and is converted to electrical signals representative of the latent image.

Several U.S. patents describe a variety of read-out systems for photostimulable phosphor screens. U.S. Pat. No. 5,180,915 (Ohgoda; Radiation Image Information Reading Apparatus; issued Jan. 19, 1993) discloses a system involving phosphor stimulation by actinic radiation. A reader simultaneously performs reading and erasing processes. The reader extracts a screen from a cassette, reads the image, erases the image and reloads a new screen into the cassette.

U.S. Pat. No. 4,931,641 (Ohgoda; Radiation Read-out Apparatus; issued Jun. 5, 1990) discloses a system involving phosphor stimulation by actinic radiation. A reader extracts a screen from a cassette or magazine, reads the image, and reloads the cassette or magazine.

U.S. Pat. No. 4,893,011 (Bauer; Method of Processing X-Ray Film Cassettes With Phosphorus-Coated Films And A Reading Station For Executing The Process) discloses a system involving phosphor stimulation by actinic radiation. A reader extracts a screen, reads the image on the screen with a laser, erases the screen, and re-inserts the screen back into the cassette.

U.S. Pat. No. Re. 31,847 (Lucky; Apparatus And Method For Producing Images-Corresponding To Patterns of High Energy Radiation; issued Mar. 12, 1985) discloses a system involving phosphor stimulation by heat.

A problem associated with these approaches is the limitations of the phosphor screens used. It is known that such intensifying screens, while increasing the amount of radiation available for detection, also have the effect of reducing the sharpness of the resultant image. In general, image distortion in luminescent screens or structures is caused by the diffusion of light within the luminescent material which causes a blurring of the image with consequent loss of definition and contrast. This diffusion of light is brought about by two fundamental physical processes. First, as the ionizing radiation is converted into light, the direction of the emission of light is random so that it is emitted approximately equally in all directions. The second effect is that the high energy radiation is penetrating, and the depth of penetration is dependent upon the energy of the impinging radiation and the nature of the material being penetrated. The higher the energy, the deeper the penetration. A lower density material will also lead to a deeper penetration. As a result, the depth of penetration dictates the required thickness of the screen.

Thus, it is seen that as visible light is generated along a path through the screen and normal to its surface, light will be radiating in all directions. Some of the light radiated at an angle off the normal to the surface of the screen will reach the detecting means and result in a diffuse image.

As a result, the design of such intensifying screens has involved a trade-off between screens of large thickness, which result in increased luminescent radiation for a given x-ray level, but which also produce decreased image sharpness, and screens of less thickness, which result in improved image sharpness relative to the thicker screens, but which also require more x-ray radiation to produce acceptable images, thereby increasing the x-ray dosage to which the patient must be exposed.

Thicker or high speed screens are utilized in those applications which do not require maximum image sharpness, thereby reducing the patient exposure to x-rays, while medium speed and slow speed screens are utilized when increased image resolution is required. These latter screens employ thinner phosphor layers and may incorporate dyes to minimize transverse propagation of light by attenuating such rays more than a normal ray which travels a shorter path. In general, detail or slow speed screens require a significantly higher x-ray dosage than the high speed screens.

To address this phosphor-related problem, manufacturers developed non-phosphor media. Unlike the phosphor systems described above, detector systems based on electrostatic imaging convert a latent image generated by exposure to x-ray radiation to an electrical signal. This is done by measuring charge flow differences which reflect the surface charge distribution when irradiated with externally applied actinic radiation.

One such media and the system in which it is used is described within U.S. Pat. No. 3,650,620 (Hoyt, III; Automated Xerographic Processing System; issued Mar. 21, 1972). This patent describes an automated system for light-controlled extraction of a electrically charged xerographic imaging plate from a cassette, reading the latent image and re-insertion of the imaging plate back into the cassette. A problem with this approach and those noted above is the requirement for special feeding devices for extracting the recording medium from the cassette and returning the recording medium back into the cassette. Special care must also be taken not to damage the surface of the recording medium during handling.

U.S. Pat. Nos. 4,176,275 (Korn et al.; Radiation Imaging and Readout System And Method Utilizing A Multi-layered Device Having A Photoconductive Insulative Layer; issued Nov. 27, 1979) and U.S. Pat. No. 5,268,569 (Nelson et al.; Imaging System Having Optimized Electrode Geometry and Processing; issued Dec. 7, 1993) disclose a photoreceptive plate which addresses the resolution limitation of the storage phosphor imaging systems. Another similar disclosure is found in U.S. patent application Ser. No. 08/163,266 (Nelson et al.; Imaging System Having Optimized Electrode Geometry and Processing; filed Dec. 6, 1993). However, being photosensitive, this photoreceptive plate must not be subjected to ambient radiation. Furthermore, this photosensitive plate can be fragile and require care when handled during imaging and read-out. Moreover, the construction of this photoreceptive plate has made the read-out of the latent image difficult.

SUMMARY OF THE INVENTION

The present invention overcomes these problems by providing a radiographic image reader and a method for acquiring electronic signals corresponding to a latent image of an object produced by radiation exposure of a photoreceptive medium within a cassette. This system and method have significant advantages over what is now known. The system reads the photoreceptive medium within the cassette automatically and with a high degree of accuracy and spatial resolution. Because the photoreceptive medium remains within the cassette, special handling equipment is avoided and the likelihood of damage to the photoreceptive medium is minimized.

In one embodiment, the present invention provides a system which has a light-tight enclosure, a scanning subsystem, and a cassette registration and interface subsystem. The light-tight enclosure has at least one access port for inserting and removing the cassette. The scanning subsystem is mounted within the light-tight enclosure for scanning the photoreceptive medium within the cassette to initiate the acquisition of the electronic signals representative of the latent image. The cassette registration and interface subsystem within the light-tight enclosure has an electronic interface structure for electronically connecting the photoreceptive medium within the cassette to an electronic component external of the cassette to obtain the electronic signals corresponding to the latent image within the photoreceptive medium.

In another embodiment, the scanning subsystem can include an optics module and a support stand. The optics module can include a laser scanner. The cassette and the cassette registration and interface subsystem can be moveable beneath a plane of the scanner support stand and any electronic component external of the cassette can be movable adjacent to the plane of the support stand during scanning of the photoreceptive medium.

Another embodiment of the present invention is a system for obtaining a high spatial resolution image with a radiographic image reader by acquiring electronic signals corresponding to a latent image of an object produced by radiation exposure of a photoreceptive medium within a cassette. The radiographic image reader includes a light-tight enclosure, a scanning subsystem, and a cassette registration and interface subsystem within the enclosure. The light-tight enclosure includes at least one access port for inserting and removing the cassette. The scanning subsystem is mounted within the light-tight enclosure for scanning the photoreceptive medium within the cassette to initiate the acquisition of the electronic signals representative of the latent image. The scanning subsystem includes an optical scanner and a scanner support stand. The scanner support stand includes means for reducing undesired vibration to minimize the effect of distortion on the optical scanning beam. The cassette registration and interface subsystem within the light-tight enclosure includes an electronic interface structure and an electrical interface structure. The electronic interface structure is provided for electronically connecting the photoreceptive medium within the cassette to an electronic component external of the cassette to obtain electronic signals corresponding to the latent image within the photoreceptive medium. The electrical interface structure is provided for electrically connecting the photoreceptive medium within the cassette to an electrical power source external of the cassette. The electronic component external of the cassette, the power source, and the cassette registration and interface subsystem are all moveable together relative to a plane of the support stand during scanning of the photoreceptive medium.

The present invention also provides a method for obtaining a high resolution image from acquisition of electronic signals corresponding to a latent image of an object produced by radiation exposure of a photoreceptive medium within a cassette in a radiographic image reader. The method includes the steps of: 1) providing a light-tight enclosure with at least one access port for inserting the cassette, 2) configuring a scanning subsystem mounted within the light-tight enclosure for scanning the photoreceptive medium within the cassette to initiate the acquisition of the electronic signals representative of the latent image, and 3) enabling a cassette registration and interface subsystem within the light-tight enclosure to electronically connect the photoreceptive medium within the cassette to an electronic component external of the cassette to obtain a high resolution image from electronic signals corresponding to the latent image within the photoreceptive medium. A further step can include connecting the electronic component and the power source to the cassette registration and interface subsystem for movement with the cassette registration and interface subsystem during scanning of the photoreceptive medium.

In another embodiment, the scanning subsystem can include an optical scanner and a scanner support stand. The scanner support stand includes vibration isolation means for reducing undesired vibration to minimize the effect of mechanical distortion of the scanning beam. The cassette registration and interface subsystem can include an electronic interface structure to electronically connect the photoreceptive medium within the cassette to an electronic component external of the cassette to obtain electronic signals corresponding to the latent image within the photoreceptive medium. The cassette registration and interface subsystem can also include an electrical interface structure for electrically connecting the photoreceptive medium within the cassette to an electrical power source external of the cassette.

BRIEF DESCRIPTION OF THE DRAWINGS

The foregoing advantages, construction, and operation of the present invention will become more readily apparent from the following description and accompanying drawings in which:

FIG. 10 is a top view of the optics module shown in FIGS. 7 and 8.

DETAILED DESCRIPTION OF THE PREFERRED EMBODIMENTS

A radiographic image reader is adapted for use within an electronic radiographic imaging system which can further include a photoreceptive medium, a power storage device, and a cassette recharger. The photoreceptive medium is described below as being housed within a cassette. Although able to function with various sizes of the cassette, the radiographic image reader, shown and described below, is designed to function with two representative sizes of cassettes: a smaller cassette, approximately 180 millimeters×240 millimeters×15 millimeters; and a larger cassette, approximately 355 millimeters×431 millimeters×15 millimeters.

Figure 1:
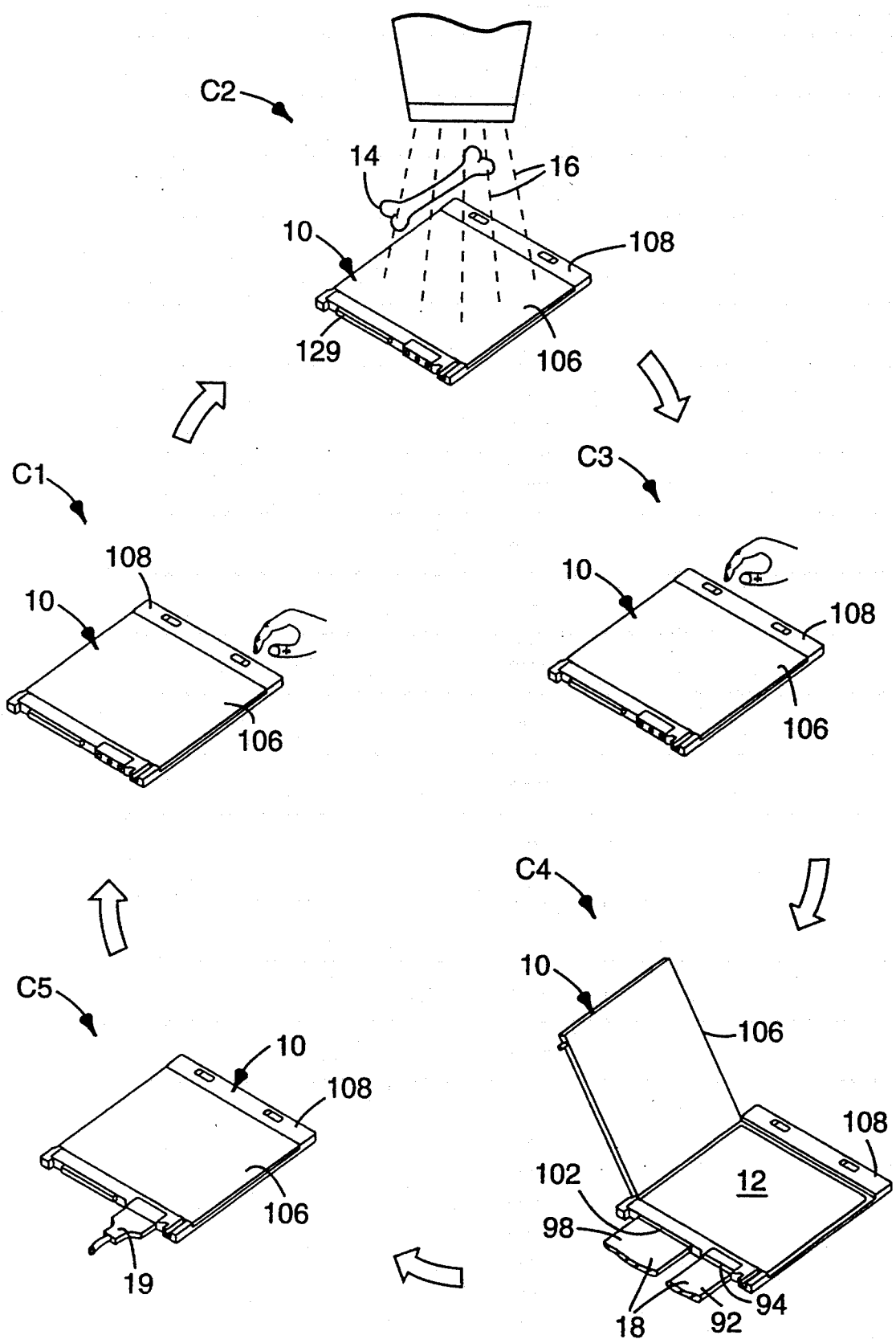
FIG. 1 is a schematic view of a cassette usable within the present invention moving through a cycle of use within an electronic radiographic imaging system.

In FIG. 1, a cassette 10 is shown moving through a cycle C of use, which generally includes five ordered steps C1–C5. While this cycle C is described below as beginning with step. C1, the cycle C can begin at other than step C1.

First, in the voltage-applying step C1, a user manually causes the power storage device (not shown) within the cassette 10 to apply a high exposure voltage to the photoreceptive medium 12 sensitizing the photoreceptive medium 12 for capture of the latent image. Second, in the medium-exposing step C2, the user positions an object 14 relative to the cassette 10 and exposes the object 14 to x-ray radiation 16. Exposure of the object 14 to the x-ray radiation 16 provides an image-wise pattern of radiation to the photoreceptive medium 12 creating the latent image of the object 14 in the photoreceptive medium 12. Third, in the image-maintaining step C3, the user can choose to reduce the voltage to a level suitable for maintaining the image for an extended period of time. Fourth, in the image-reading step C4, the user connects the cassette 10 to components within the radiographic image reader 18 by inserting the cassette 10 into the radiographic image reader 18. The radiographic image reader 18 then reads, or extracts, the latent image. The radiographic image reader 18 also reconditions the photoreceptive medium 12 which partially prepares the photoreceptive medium 10 for the next cycle C. To complete the cycle C, in the cassette-recharging step C5, the user connects the cassette 10 to a recharger 19 to finalize the preparation of the cassette 10 for the next cycle C.

This cycle C and a preferred embodiment of the cassette 10 and the recharger 19 are disclosed in co-pending U.S. patent application Ser. No. 08/220,899 (Krepel et al.; Cassette For Use In An Electronic Radiographic Imaging System; filed Mar. 31, 1994), which is hereby incorporated by reference. The construction and methods of using the photoreceptive medium 12 are described in detail in U.S. Pat. No. 5,268,569 (Nelson et al.; Imaging System Having Optimized Electrode Geometry and Processing; issued Dec. 7, 1993) and U.S. patent application Ser. No. 08/163,266, now U.S. Pat. No. 5,354,982 (Nelson et al.; Imaging System Having Optimized Electrode Geometry and Processing; filed Dec. 31, 1992), both which are hereby incorporated by reference. The radiographic image reader 18 for completing the image-reading step C4 is described below.

The radiographic image reader 18 is designed to acquire electronic signals representative of a radiographic latent image from the photoreceptive medium 12 in the cassette 10. This is done while minimizing any additional artifacts or imperfections in the final high spatial resolution digital image as a result of the reading process. Following the reading process, the radiographic image reader 18 can recondition the photoreceptive medium 12 partially preparing the photoreceptive medium 12 for the next cycle C. Generally, the radiographic image reader 18 includes a cassette registration and interface subsystem, a data acquisition subsystem, a cassette manipulation subsystem, a scanning subsystem, a vibration damping subsystem, and an environment controlling subsystem. These subsystems are described in detail below.

Figure 2:
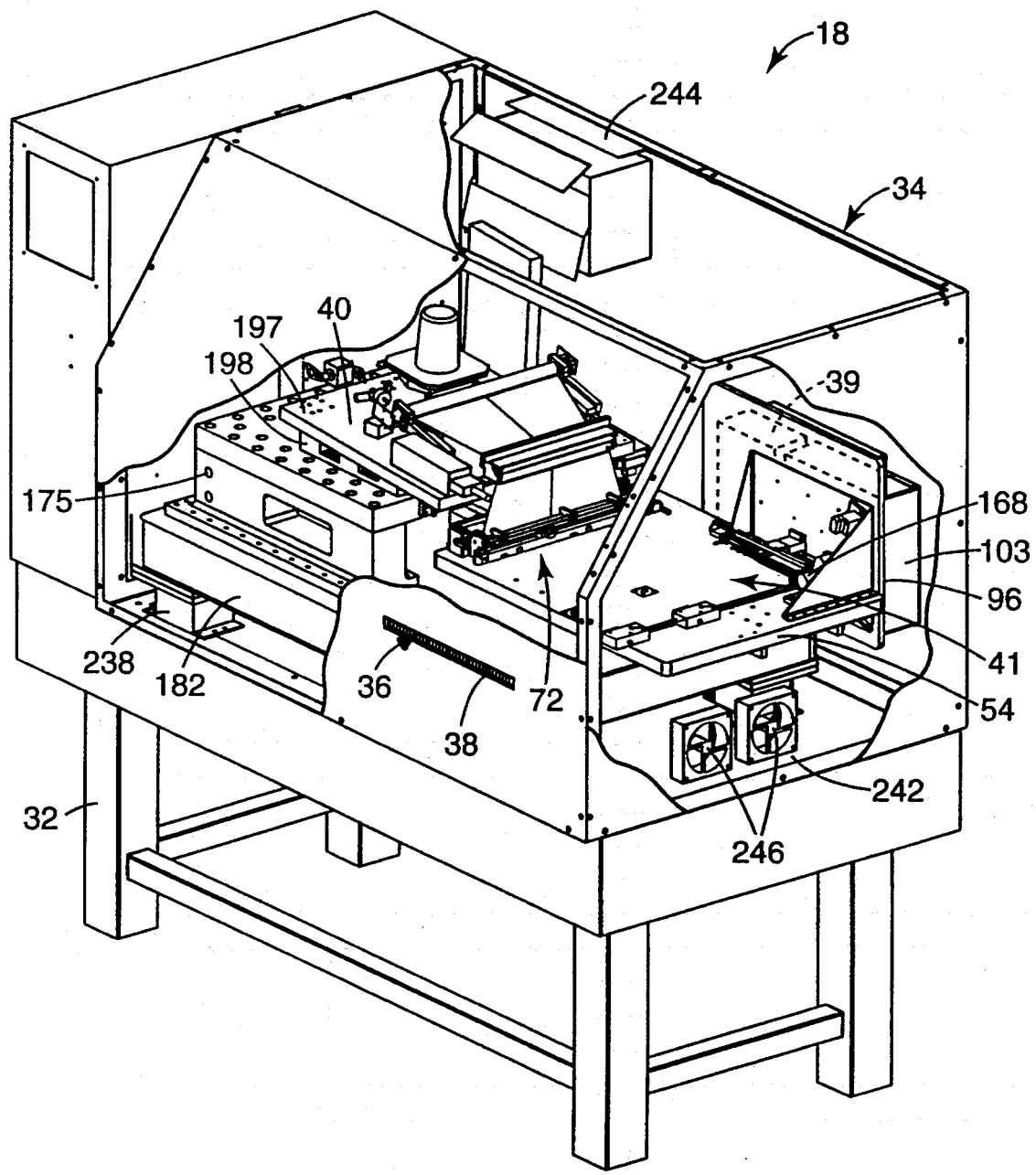
FIG. 2 is an isometric view of a radiographic image reader according to the present invention having portions of the exterior cut away to show internal structure of the radiographic image reader.

As shown in FIG. 2, the radiographic image reader 18 includes a support table 32 which supports the subsystems noted above. As also shown in FIG. 2, the radiographic image reader 18 also includes a light-tight enclosure 34 which protects the photoreceptive medium 12 from extraneous actinic radiation. The cassette 10, which is adapted for use with the radiographic image reader 18 is illustrated in greater detail in FIG. 3.

The light-tight enclosure 34 includes an access port 36 to allow the user to insert the cassette 10 into the light-tight enclosure 34. Light-tightness is accomplished at the access port 36 by using either a plurality of overlapping brushes 38, as shown, or a mechanism (not shown) which automatically blocks the access after the cassette 10 is inserted into the radiographic image reader 18.

Rather than an access port 36, the light-tight enclosure 34 could include a openable door (not shown). When closed, the openable door forms a light-tight seal with the remainder of the light-tight enclosure 34. With this embodiment, the sliding door could be opened and closed when the user inserts or removes the cassette 10.

As the cassette 10 is inserted, the cassette registration and interface subsystem can mechanically register the cassette 10, electrically connect the cassette 10 to a power source 39, and electronically connect the cassette 10 to the data acquisition subsystem. The cassette manipulating subsystem then prepares the cassette 10 for the scanning of the photoreceptive medium 12. The scanning subsystem includes an optics module 40 which initiates the acquisition of the electronic signals representative of the latent image of the object 14 as the scanning subsystem translates the cassette 10 relative to the optics module 40. The data acquisition subsystem acquires and process the electronic signal initiated by the scanning. Following the scanning and data acquisition, the scanning subsystem also electro-optically reconditions the photoreceptive medium 12 for the next cycle C. The vibration damping subsystem minimizes vibration which allows for optimal scanning and data acquisition. The environment controlling subsystem can exchange and filter air to minimize the deposition of foreign matter on the medium 12 and optical elements in the scanning subsystem. The following is a more detailed description of these subsystems and how they combine to provide a high resolution radiographic image reader.

The Cassette Registration and Interface Subsystem

Figure 3:
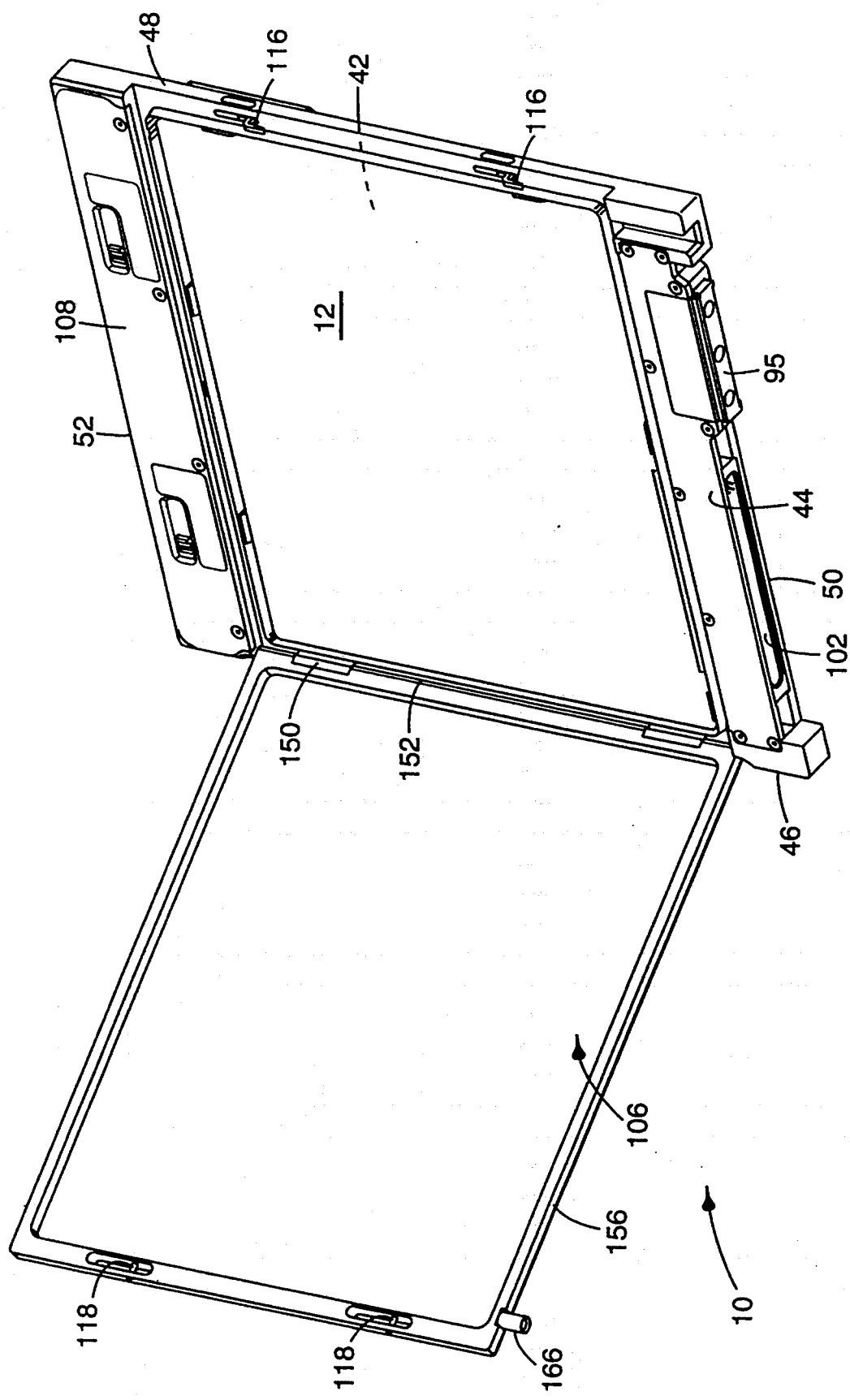
FIG. 3 is an isometric view of the cassette of FIG. 1 which can function with the radiographic image reader of FIG. 2.
Figure 4:
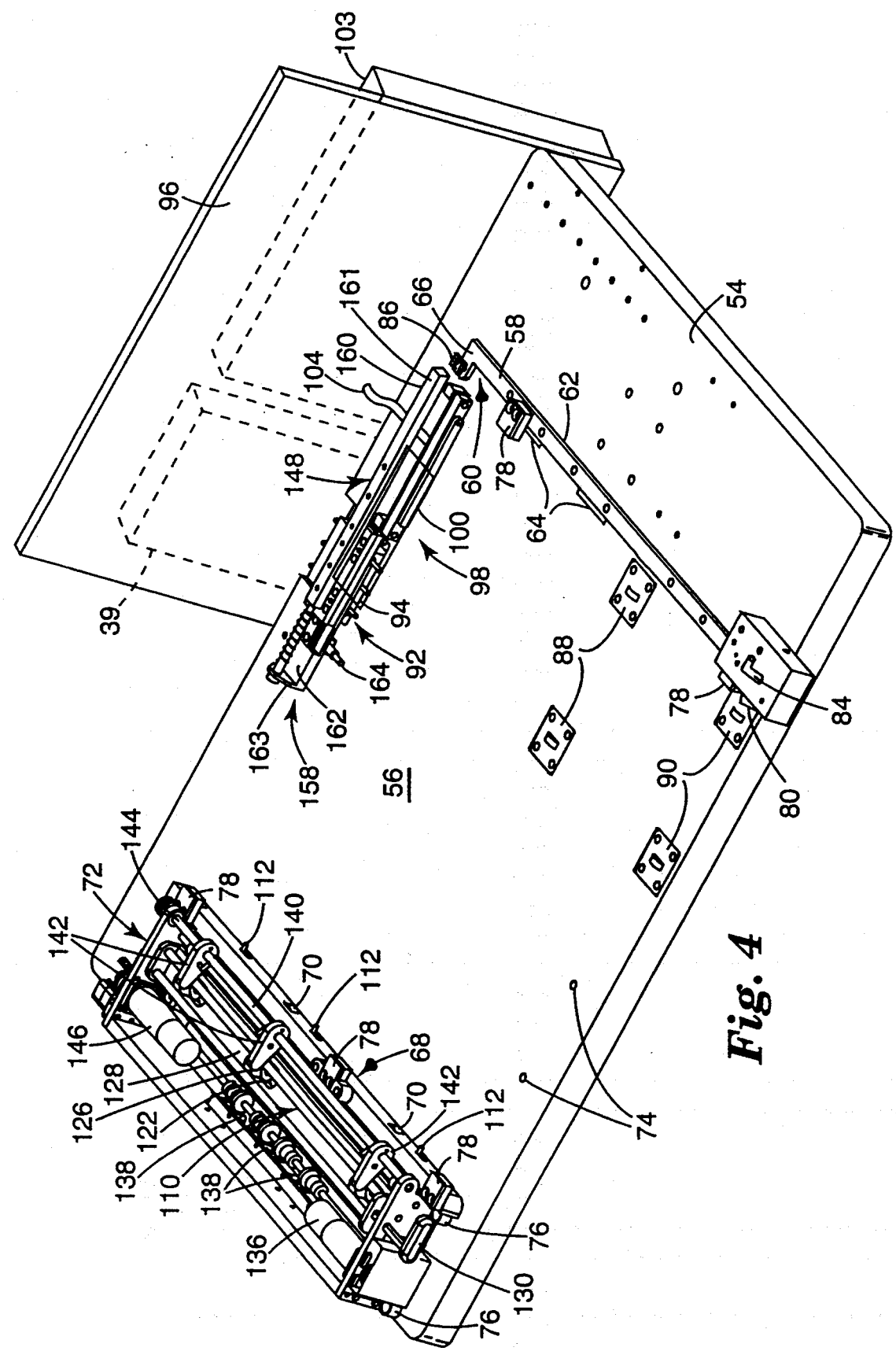
FIG. 4 is an isometric view of a carriage plate within the radiographic image reader of FIG. 2 on which the cassette of FIG. 3 rests.

The cassette registration and interface subsystem relates to structure within the radiographic image reader 18 that mechanically, electrically, and electronically interface with the cassette 10. The cassette registration and interface subsystem includes a registration structure 41 for physically receiving and registering the cassette 10, as shown in FIGS. 2 and 4. The cassette 10, as shown in FIG. 3, has a bottom surface 42, a top surface 44, a back end 46, a front end 48, a first side end 50, and a second side end 52. The orientations of the surfaces 42, 44 and the ends 46, 48, 50, 52 of the cassette 10 relative to one another are important for proper registration and scanning of the cassette 10.

The registration structure shown in FIGS. 2 and 4 includes a carriage plate 54 having a flat surface 56 on which the bottom surface 42 of the cassette 10 rests when slid into place. The carriage plate 54 can be moved partially beneath the optics module 40 after the cassette 10 is slid onto the flat surface 56. The flat surface 56 is used as a horizontal reference surface to properly position the photoreceptive medium 10 relative to the optics module 40 within the scanner subsystem.

The registration structure 41 also includes an L-shaped registration rail 58 which creates a datum corner 60. A long leg 62 of the registration rail 58 includes two raised lands 64 which contact the back end 46 of the cassette 10. A short leg 66 of the L-shaped registration rail 58 contacts a portion of the first side end 50 of the cassette 10. Together, the short leg 66 and the raised lands 64 provide three-point registration of the cassette 10 on the carriage plate 54.

The registration structure 41 further includes a cassette receiving rail 68 which has side biasing cushions 70 for contacting the front end 48 of the cassette 10. The side biasing cushions 70 resiliently biases the cassette 10 against the long leg 62 of the registration rail 58 for proper registration of the cassette 10. To bias the cassette 10, the side biasing cushions 70 can include various forms of springs (not shown).

The cassette receiving rail 68 and its side biasing cushions 70 are shown as part of a two-position assembly 72 which can be moved between two positions to accommodate the two cassette sizes. This accommodation is provided by two pair of locating bolt holes 74 on the carriage plate 54 which mates with locating bolts 76 on the two-position assembly 72. Each pair of locating bolt holes 74 allows the two-position assembly 72 to function with one of the cassette sizes. The two-position assembly 72 is shown positioned for accommodating the larger cassette size. The pair of locating bolt holes 74 which can be seen in FIG. 4 are positioned to mate with the locating bolts 76 if the user wishes to reposition the two-position assembly 72 to accommodate the smaller cassette size. Of course, the locating bolt holes 74 could be replace with locating slots (not shown) which could be used to accommodate a wider variety of cassette sizes.

Attached and atop the cassette receiving rail 68, two top biasing cushions 78 contact the top surface 44 of the cassette 10 as the cassette 10 is slid into the datum corner 60. Two other top biasing cushions 78 are shown attached and atop the long leg 62 of the registration rail 58. The top biasing cushions 78 guide the cassette 10 and retain the bottom surface 42 of the cassette 10 against the flat surface 56 of the carriage plate 54. Like the side biasing cushions 70, the top biasing cushions 78 can include various forms of springs to provide the downward biasing force. The downward biasing force is important because the vertical position of the cassette 10 relative to structure within the scanning subsystem (described below) has a total tolerance of approximately 0.020 inch.

The registration structure 41 also includes a registration lock 80 which resiliently biases the first side end 50 of the cassette 10 against the short leg 66 of the registration rail 58. When the cassette 10 is slid on the carriage plate 54 and into the datum corner 60, the spring-loaded registration lock 80 springs outwardly and engages the second side end 52 of the cassette 10. This engagement prevents the cassette 10 from moving away from the short leg 66 of the registration rail 58. As a result, the registration lock 80, together with the side and top biasing cushions 70, 78, snugly retains the cassette 10 into a position suitable for scanning. To disengage the cassette 10, the registration lock 80 includes a registration lock release 84.

To further insure correct positioning of the cassette 10, the registration structure 41 includes one or more position sensors 86. The position sensors 86 can be pressure sensitive so that the cassette 10, when in the correct position, applies pressure to the position sensors 86. The sensors 86 could be part of an electrical circuit (not shown) which controls the operation of part or all of the image-reading step C4. Therefore, the position sensors 86 sense the presence of the cassette 10 and signal, for example, a controller within the circuit to proceed with the image reading step C4.

The cassette registration and interface subsystem also includes a pair of switch resetting button for resetting electrical switch actuators on the cassette 10 to a position in which the cassette 10 begins the image-reading step C4. The electrical switch actuators are used within the cassette 10 to control the voltage applied across the photoreceptive medium 12. Resetting the electrical switch actuator disengages a power supply (not shown) within the cassette 10. The power source 39 within the radiographic image reader 18 provides a selected one of a plurality of voltages to the photoreceptive medium 12 during the image-reading step C4. The power source 39 can, instead, include a plurality of power sources so that each power source provides one of the plurality of voltages.

The location and configuration of the switch resetting buttons are determined by the particular configuration of the cassette 10 being used. The embodiment shown includes two pairs of switch resetting buttons on the carriage plate 54. A first pair of switch resetting buttons 88 is positioned to mate with a corresponding pair of switch actuators (not shown) on the bottom surface 42 of the smaller cassette, and a second pair of switch resetting buttons 90 is positioned to mate with a corresponding pair of switch actuators (not shown) on the bottom surface 42 of the larger cassette. As a result, when the larger cassette 10 is slid into the datum corner 60, the second pair of switch resetting buttons 90 contact the two switch actuators. This contact causes the switch actuators to move and reset, which changes the voltage applied to the photoreceptive medium 12 within the cassette 10.

The switch resetting button 88, 90 are spring-loaded so that they are depressed by the bottom surface 42 of the cassette 10 allowing a minimal friction during the insertion of the cassette 10 into the datum corner. In addition, after the switch resetting buttons 88, 90 reset the switch actuators, the switch actuators move away from the switch resetting buttons 88, 90 so that the switch resetting buttons 88, 90 do not apply an upward force against the cassette 10. This allows the cassette 10 to remain against the flat surface 56 of the carriage plate 54 and at the proper distance from the optics module 40.

The cassette registration and interface subsystem also includes an electrical interface structure 92. The electrical interface structure 92 includes means for electrically connecting the photoreceptive medium 12 within the cassette 10 to the power source 39. One embodiment of the electrical interface structure includes a three-pin connector 94 which is mounted to the carriage plate 54. The three-pin connector 94 is designed and positioned to mate with a female electrical block 95 located on the first side end 50 of the cassette 10 when slid onto the carriage plate 54.

The three-pin connector 94 is electrically connected to the power source 39 which is mounted to a vertical support plate 96. The vertical support plate 96 is attached to the carriage plate 54 so that the power source 39 is fixed relative to the carriage plate 54. The power source 39 should be capable of providing a selected one of a plurality of voltages to photoreceptive medium 12 within the cassette 10. These voltages are applied to photoreceptive medium 12 during scanning and reconditioning of the photoreceptive medium 12, which is discussed in greater detail below.

The cassette registration and interface subsystem also include an electronic interface structure 98. The electronic interface structure 98 provides means for electronically connecting the photoreceptive medium 12 within the cassette 10 to the data acquisition subsystem. One embodiment of the electronic interface structure 98 includes a female electronic connector 100 which is mounted to the carriage plate 54. The female electronic connector 100 is designed and positioned to mate with a multi-pin connector 102 located on the first side end 50 of the cassette 10. The female electronic connector 100 is electronically connected to detection electronics 103 within the data acquisition subsystem by a flexible connector circuit 104.

This connection allows the detection electronics 103, or another electronic component external of the cassette 10, to acquire the electronic signal corresponding to the latent image within the photoreceptive medium 12 and to format the signal for later use. The detection electronics 103 should be rigidly mounted to the vertical support plate 96 so that the data acquisition subsystem is fixed relative to the carriage plate 54. The detection electronics 103 are enclosed within a magnetic steel casing to minimize reception of ambient electronic noise. Details regarding the detection electronics 103 are disclosed in greater detail beginning in column 6, line 12 of U.S. Pat. No. 5,268,569, which has been incorporated by reference, The Cassette Manipulating Subsystem The top surface 44 of the cassette 10 includes an openable portion or openable cover 106, which the cassette manipulating subsystem unlatches and opens before scanning occurs. Similarly, the cassette manipulating subsystem closes and latches the openable cover 106 after scanning has occurred. The openable cover 106 shown in FIG. 3 is latchable to a base 108 at the front end 48 of the cassette 10.

Figure 5:
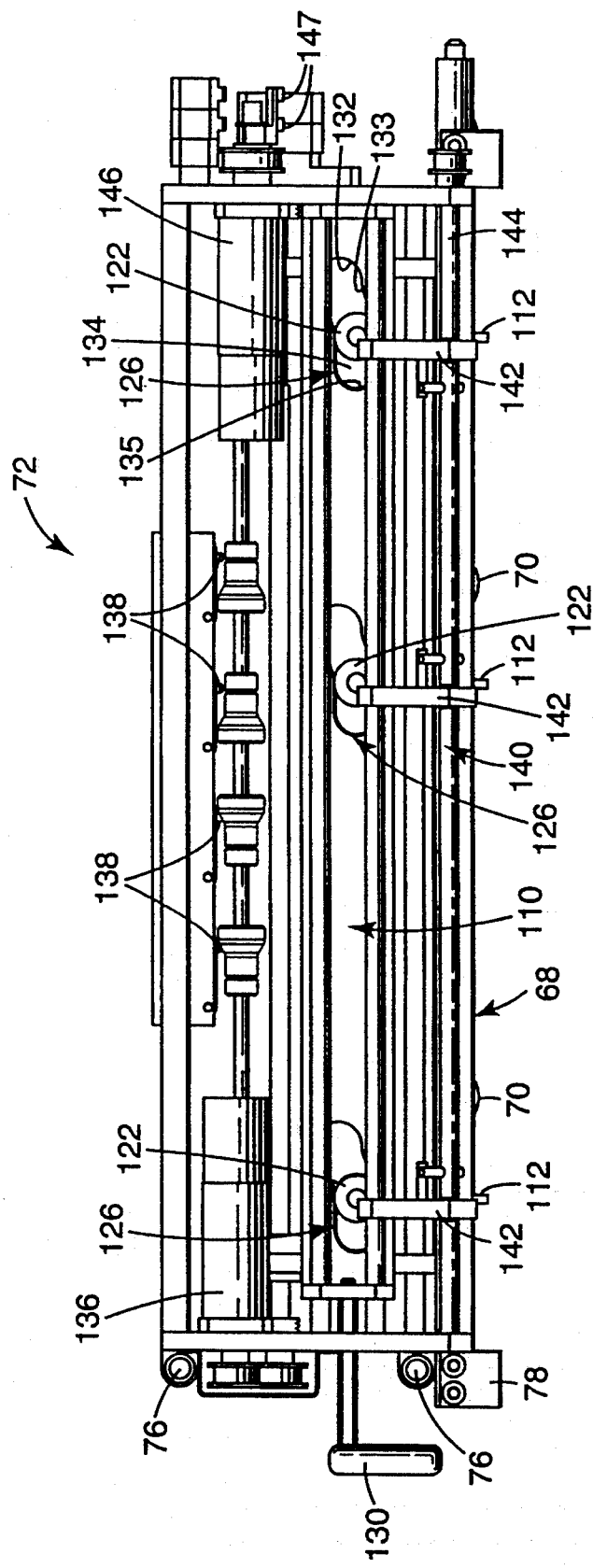
FIG. 5 is a top view of a two-position assembly within the radiographic image reader of FIGS. 2 and 4.

To unlatch and latch the openable cover 106, the cassette manipulating subsystem includes a latch/unlatch assembly 110 which includes at least one latch engagement pin 112, as shown in FIGS. 4 and 5. The embodiment shown includes three latch engagement pins 112. The latch engagement pins 112 are movable and can orthogonally protrude from and retract within the cassette receiving rail 68.

Figure 6:
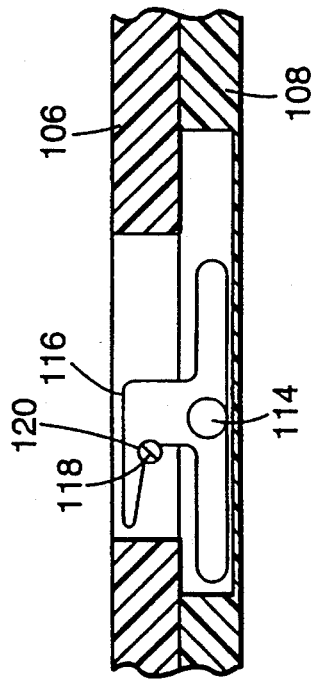
FIG. 6 is a partial cross-sectional view of the cassette of FIG. 3 showing a sliding hook within the base of the cassette latched to a cover latch pin within the openable cover of the cassette.

Before the cassette 10 is slid onto the carriage plate 54 and against the side biasing cushions 70, the latch engagement pins 112 are retracted within the cassette receiving rail 68. After the cassette 10 is inserted and the front end 48 is against the cassette receiving rail 68, each latch engagement pin 112 can be protruded to mate with a pin hole 114 in a corresponding sliding hook 116 within the base 108 of the cassette 10, as shown in FIG. 6. Sliding hooks 116 are shown engaging corresponding cover latch pins 118. The cover latch pins 118 are fixed within the openable cover 106 on the front end of the cassette 10. When the sliding hooks 116 slide over and engage the cover latch pins 118, the openable cover 106 of the cassette 10 is latched to the base 108 of the cassette 10. Each sliding hook 116 includes a detent 120 in which the respective cover latch pin 118 rests during engagement.

To enable the latch engagement pins 112 to protrude and retract, each latch engagement pin 112 is connected to a cam follower 122 by connecting blocks (not shown). The cam followers 122, connecting blocks, and the latch engagement pins 112 are movable toward the cassette 10 so that the latch engagement pins 112 protrude and retract from the cassette 10. Each cam follower 122 rides within a cam 126 which is a flattened S-shaped slot within a cam plate 128. The cam plate 128 is movable in a direction orthogonal to the direction in which the cam followers 122 are moveable. The cam plate 128 is connected to a push rod 130 which is manually operated to move the cam plate 128 and cams 126.

Movement of the cam plate 128, therefore, causes movement of the cam followers 122 and the latch engagement pins 112. When the push rod 130 is pushed toward the cam followers 122, the movement of the cam plate 128 causes each cam follower 122 to ride up from a first cam end 132 of the respective cam 126 to the angled portion 133, as shown. This causes each cam follower 122 to move toward the cassette receiving rail 68. This, in turn, forces each respective latch engagement pin 112 to protrude from the cassette receiving rail 68 and engage with the hook pin hole 114 in the respective sliding hook 116.

For the sliding hooks 116 to be disengaged from the cover latch pins 118, the latch engagement pins 112 are moveable in a direction orthogonal to the direction of the protruding/retracting movement. This movement of the latch engagement pins 112 can be accomplished because the latch engagement pins 112 are connected to a latch plate 134. The latch plate 134 rests below the cam plate 128 and is moveable orthogonal to the second side end 52 of the cassette 10. This forces the sliding hooks 116 to slide away and disengage from the cover latching pins 118, thereby unlatching the openable cover 106 of the cassette 10 from the base 108. As shown, the cams 126 extend from the angled portion 133 to a second cam end 135 which provides clearance for the cam followers 122 during the movement of the latch plate 134. Re-latching the openable cover 106 is accomplished by re-engaging the sliding hooks 116 with the cover latch pins 118.

The latch plate 134 can be driven by a first motor 136 and controlled by latch plate end-of-travel switches 138. Two pairs of latch plate end-of-travel switches 138, as shown, provide redundancy.

The cassette manipulating subsystem also includes a latch assisting mechanism 140 to assure the proper latching and unlatching of the sliding hooks 116. The latch assisting mechanism 140 forces the openable cover 106 against the base 108 to properly position the cover latch pins 118 relative to the sliding hooks 116 for engagement and disengagement of the cover latch pins 118.

The latch assisting mechanism 140 is shown as including three cover contacting members 142 which are connected to a rotating rod 144. The rotating rod 144 is parallel to and located just above the cam plate 128. Each cover contacting member is in a plane which is orthogonal to the cassette receiving rail 68. A second motor 146 which is connected to the rotating rod 144 causes the rotating rod 144 and the cover contacting members 142 to rotate. The rotational travel of the latch assisting mechanism 140 can be controlled with rod end-of-travel switches 147.

The latch assisting mechanism 140 is oriented so that cover contacting members 142 are moveable back from the cassette receiving rail 68 when the cassette 10 is being slid against the side biasing cushions 70. After the cassette 10 is against the side biasing cushions 70 on the cassette receiving rail 68, but prior to the disengagement of the sliding hooks 116 from the cover latch pins 118, the second motor 146 rotates the cover contacting members 142. This rotation causes the cover contacting members 142 to squeeze the openable cover 106 of the cassette 10 to the base 108. This forces each cover latch pin 118 downward relative to the respective sliding hook 116 and out of the detent 120. Once the cover latch pins 118 are out of the detents 120, minimal friction results with the sliding hooks 116 during disengagement. Conversely, when the openable cover 106 of the cassette 10 is relatched to the base 108, the latch assisting mechanism 140 can be used to squeeze the openable cover 106 against the base 108 prior to engaging the sliding hooks 116 with the cover latch pins 118.

When unlatched, the openable cover 106 shown has the ability to be pivotably opened. The openable cover 106 can pivot opened due to a hinge connection 150 between a back edge 152 of the openable cover 106 and the base 108. For opening the openable cover 106, the cassette manipulating subsystem includes a cover opening mechanism 148.

The cover opening mechanism 148 includes an armature 158. The armature 158 includes a main member 160 at a attached end 161 of the armature 158 which is pivotably attached to the carriage plate 54. The armature 158 also includes a sliding member 162 at the free end 163 of the armature which is slidably attached to the main member 160. A male opening pin 164 for engaging the cover extends from the sliding member 162 and is substantially parallel to the long leg 62 of the registration rail 58.

The armature 158 is shown in FIG. 4 in a first position resting against the flat surface 56 of the carriage plate 54 and just above the three-pin connector 94 and the female electronic connector 100. The male cover opening pin 164 is positioned relative to the long leg 62 so that when the cassette 10 is slid into place against the long leg 62, the male cover opening pin 164 engages with a female cover opening pin 166 which is attached to the cassette openable cover 106. The female cover opening pin 166 extends orthogonally and outwardly from a first side edge 156 of the openable cover 106.

Figure 7:
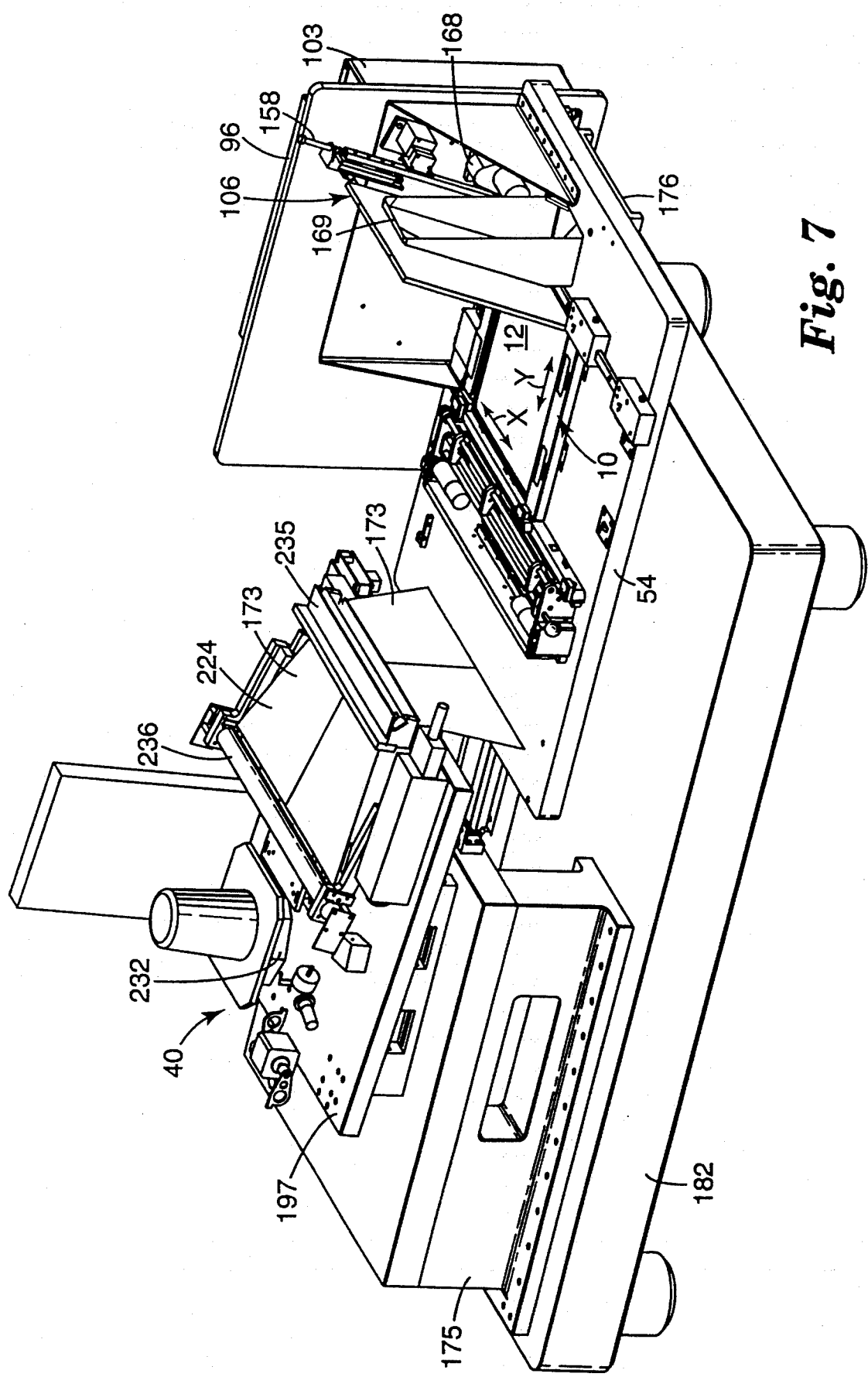
FIG. 7 is an isometric view of the radiographic image reader of FIG. 2 and an opened cassette of FIG. 3 in a first position.
Figure 8:
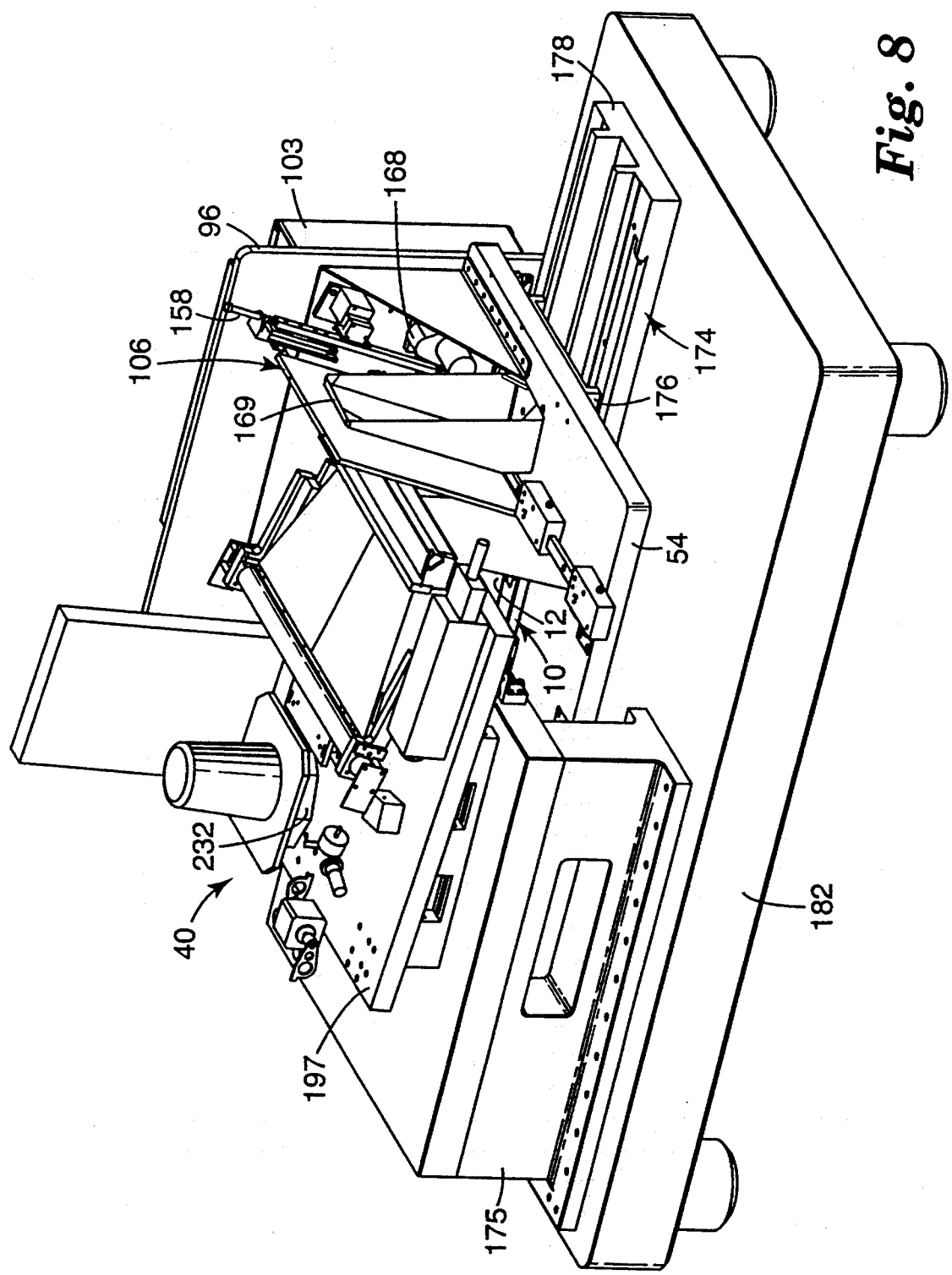
FIG. 8 is an isometric view of the radiographic image reader and the opened cassette of FIG. 7 in a second position.

When the male and female cover opening pins 164, 166 are mated and the openable cover 106 is unlatched, the armature 158 can be pivoted upwardly from the carriage plate 54. Pivoting the armature 158 approximately 120 degrees to a second position opens the openable cover 106 and allows for the scanning of the photoreceptive medium 12, as shown in FIGS. 7 and 8. A third motor 168 provides the force to pivot the armature 158, and end-of-travel switches (not shown) can be used to control the third motor 168. When opened, the openable cover 106 rests against a cover supporting wall 169 which is attached to the carriage plate 54.

Because the hinged connection between the openable cover 106 and the base 108 can be offset from the hinged connection between the main member 160 of the armature 158 and the carriage plate 54, the arc struck by the openable cover 106 is not concentric to the arc struck by the armature 158. To adjust for this non-concentricity and to provide for a smooth opening motion, the sliding member 162 slides relative to the main member 160 as the armature 158 is pivoted. As a result of the slidable motion of the sliding member 162 relative to the main member 160, the length of the armature can be continuously adjusting. The arc struck by the male cover opening pin 164, therefore, adjusts to match that of the female cover opening pin 166.

The Scanning Subsystem

The scanning subsystem accomplishes the scanning of the photoreceptive medium 12. Scanning is a bi-directional process. First, scanning includes the directing of a scanning beam 173 across the x-axis X of the photoreceptive medium 12. The scanning beam 173 is created and directed by the optics module 40. Second, scanning includes translating the cassette 10 along the y-axis Y of the photoreceptive medium 12 and relative to the optics module 40. This translation is accomplished with the use of a linear translation stage 174 on which the carriage plate 54 is slidably translated. The linear translation stage 174 slides the carriage plate beneath a support stand 175 on which the optics module 40 rests.

The scanning subsystem has the ability to translate the carriage plate 54 at a uniform velocity while keeping the photoreceptive medium 12 properly registered relative to the optics module 40. Uniform velocity and proper registration of the photoreceptive medium 12 allows for proper positioning of the scanning beam 173 along the y-axis Y of the photoreceptive medium 12. Proper positioning of the scanning beam 173 is an important factor affecting the image quality acquired by the radiographic image reader 18. Poor positioning of the scanning beam 173 can increase image noise and degrade spatial resolution.

For high resolution scanning, the linear translation stage 174 shown in FIGS. 7 and 8 can translate the carriage plate 54 at a velocity of 5.3 mm per second with a variation of velocity of less than 0.1%. Also, for high resolution scanning, the optics module 40 can direct the scanning beam 173 across the photoreceptive medium 12 one time every millisecond. For lower resolution scanning, translation velocity can be increased and a greater velocity variation can be allowed. Preferably, the speed of the scanning beam 173 remains constant.

In use, the carriage plate 54 is translated between a first position, shown in FIG. 7, and a second position, shown in FIG. 8. While in the first position, the carriage plate 54 can receive and register the cassette 10. Between the first and second positions, the carriage plate 54 allows the scanning subsystem to scan and recondition the photoreceptive medium 12. While in the second position, the photoreceptive medium 12 is beneath the support stand 175 and optics module 40.

The linear translation stage 174 which translates the carriage plate 54 at a uniform velocity is commercially available. The linear translation stage 174 includes an upper slide 176, a lower slide 178 which mates with and rests below the upper slide 176, and a stage motor (not shown). The upper slide 176 is located below and attached to the carriage plate 54. The lower slide 178 is fixed to an isolation platform 182 which is rigid and flat. The stage motor is mounted to the lower stage 178 and drives the upper slide 176 over the lower slide 178, uniformly translating the attached carriage plate 54 between the first and second position. The stage motor is controlled by the radiographic image reader 18 via a power/control cable (not shown).

The support stand 175 is attached to the isolation platform 182 and is designed to allow the photoreceptive plate 12 within the cassette 10 to pass below the optics module 40 during scanning and reconditioning. The support stand 175 can be cantilevered to allow the vertical support plate 96, on which the power source 39 and data acquisition electronics 103 are mounted, to pass along side the optics module 40 when the carriage plate 54 is translated below the support stand 175. This, in turn, allows the data acquisition subsystem and the flexible connector circuit 104 to remain in a fixed position relative to the cassette 10 during scanning. Minimizing the movement of the data acquisition electronics 103 and the flexible connector circuit 104 relative to the cassette 10 minimizes electronic noise, another factor affecting the quality of the image acquired by the radiographic image reader 18.

In addition, the support stand 175 is designed to minimize the vibration of the optics module 40. Minimizing vibration of the optics module 40 reduces the misalignment of the scanning beam 173 along either the x-axis X or y-axis Y shown in FIG. 7. Minimizing vibration is another factor which improves the spatial resolution and minimizes the noise. Details specific to the support stand 175 are disclosed in a co-pending U.S. patent application filed on even date herewith and identified currently as 3M Docket No. 50135USA9A (Esch et al.; Support Stand For An Optical Scanning Module), which is hereby incorporated by reference.

Alignment mounts are used to attached the optics module 40 to the support stand 175 and to allow for the alignment of the scanning beam 173 relative to the photoreceptive medium 12. Kinematic mounts 196 shown in FIG. 9 connect the support stand 175 to an optics module plate 197 on which the optical elements within the optics module 40 rest. The kinematic mounts 196 minimize mechanical distortion of the scanning subsystem which can effect the alignment of the scanning beam 173. Kinematic mounts 196 allow for limited movement between the support stand 175 and the optical module plate 197 due to thermal expansion and contraction without causing scanning misalignment. The kinematic mounts 196 also prevent mechanical distortion of the optics module 40 due to stress induced by attaching the optics module plate 197 to the support stand 175.

Figure 9:
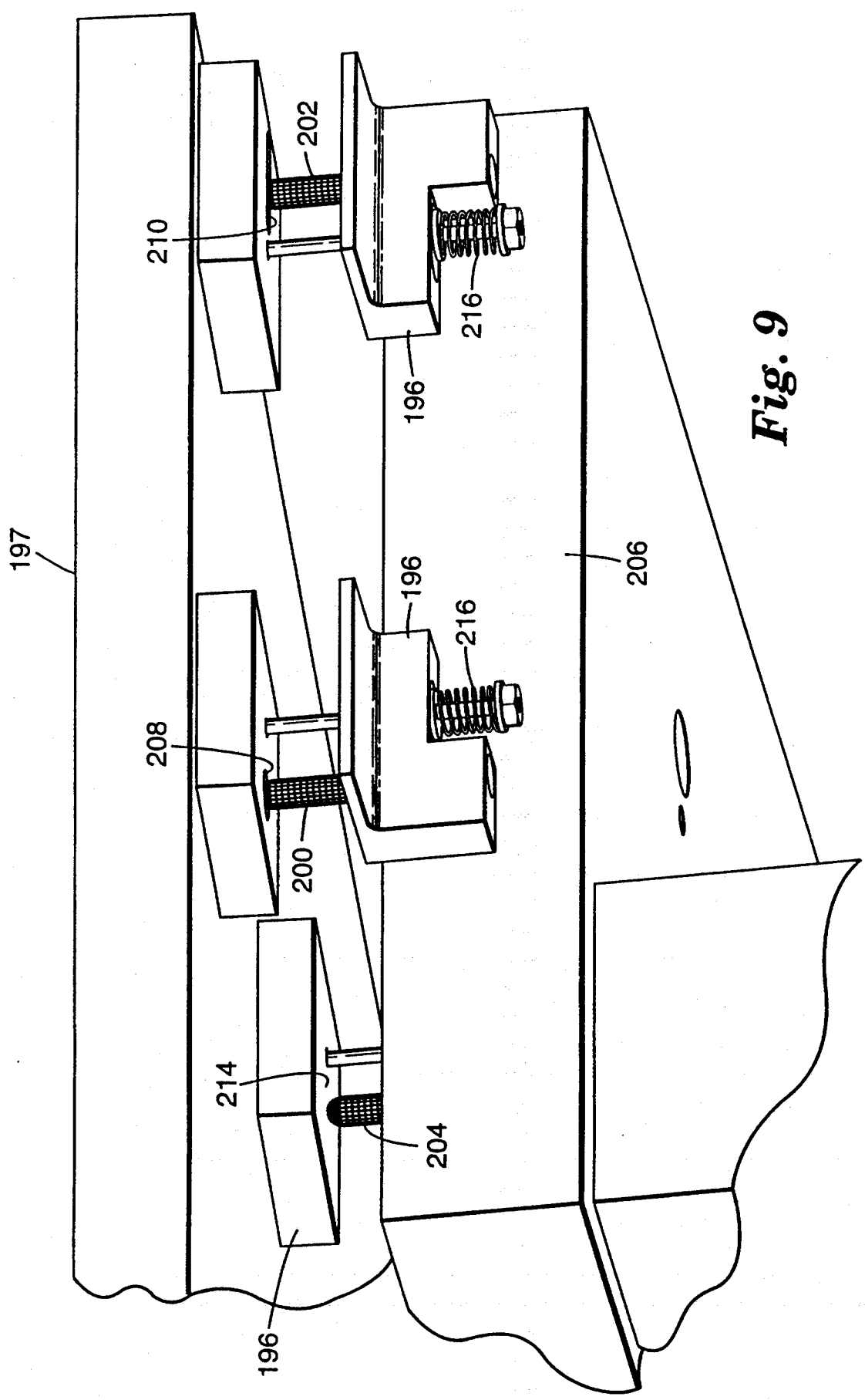
FIG. 9 is an isometric view of alternative kinematic mounts connecting the optics module plate to the support stand within the radiographic image reader.

One embodiment of a kinematic mount 196 includes the use of a pin. As shown in FIG. 9, three kinematic mounts 196 include respective pins 200, 202, 204. The pins 200, 202, 204 are mounted so that varying degrees of freedom are employed according to the location of the pins 200, 202, 204. Each of the three pins 200, 202, 204 can provide one rotational degree of freedom. Pin 200 located on a front portion 206 of the support stand 175 is nested in a tapered hole 208 within the optics module plate 197. Pin 200 and tapered hole 208 provide no translational degree of freedom. Pin 202 is nested in a slot 210 within the optics module plate 197 to allow movement between the optics module plate 197 and the support stand 175 along the slot 210. Pin 202 and slot 210 provide one translational degree of freedom. Pin 204 is located in a rear portion of the support stand 175 and nested against a flat 214 on the optics module plate 197 to allow horizontal movement. Pin 204 and flat 214 provide two translational degrees of freedom. It is known that vertical movement between the optics module plate 197 and the support stand 175 is constrained by a compliant member 216 at each kinematic mount 196 which maintains contact between the optics module plate 197 and the support stand 175.

Alternate mounts useful with this system include two wedge mounts 198 shown in FIG. 2. While wedge mounts 198 can be more difficult to align than kinematic mounts 12, the wedge mounts 198 provide desired rigidity and damping of an scanner subsystem. Without the freedom of movement offered by kinematic mounts 196, use of wedge mounts 198 can cause mechanical distortion and scanning misalignment due to stress caused by thermal expansion and stress caused when tightening the optics module plate 197 to the support stand 175.

The optical elements within the optics module 40 are also important factors affecting the resolution of the radiographic image reader 18. The optics module 40, for scanning, can include a scanning laser 218 and a timing laser diode 220, as shown in FIG. 10. The scanning laser 218 emits the scanning beam 173, having a wavelength within the green to blue portions of the spectrum. The timing laser diode 220 emits a timing beam 224, having a wavelength within the red portion of the spectrum.

An acousto-optical modulator 228 generally switches the scanning beam 173 on and off in a timed pattern. The timed pattern is set to match the position and geometry of the photoreceptive medium 12 being scanned.

A beam selection and focusing assembly 230 controls the spot size of the scanning beam 173. Mirrors align the beams 173, 224 and direct the beams 173, 224 in the direction of a rotating polygon mirror 232. The rotating polygon mirror 232 scans the beams 173, 224 toward a scraping mirror 234, shown within a mirror housing 235, which directs the timing beam 224 toward a grating clock 236. The grating clock 236 monitors the instantaneous position of the scanning and timing beams 173, 224 in order to produce the timed pattern used to modulate the scanning beam 173.

To direct the unscraped scanning beam 173 toward the photoreceptive medium 12, a bending mirror 237, shown within the mirror housing 235, reflects the scanning beam 173 downwardly from the optics module 40. The scanning beam 173 scans across the x-axis X of the photoreceptive medium 12 due to the rotation of the polygon mirror 232 and scans across the y-axis Y of the photoreceptive medium 12, as previously noted, due to the translation of the cassette 10.

The angle of incidence at which the scanning beam 173 strikes the photoreceptive medium 12 along the x-axis X varies during scanning. This variation is preferably not more than 18 degrees from a normal angle of incidence. An 18-degree range allows for proper placement of the scanning beam 173 along the x-axis X, based on the distance between the flat surface 56 of the carriage plate 54 and the optics module 40. Maintaining this 18-degree range, when considered with both the proper beam modulation and vibration minimization, is an important factor affecting the resolution of the radiographic image reader.

The angle of incidence at which the scanning beam 173 strikes the photoreceptive medium 12 along the y-axis Y is maintained at an angle just off normal. This prevents reflection of the scanning beam 173 back toward the optics module 40 possibly causing beam interference. Minimizing the variation of the angle of incidence along the y-axis Y is another factor affecting the resolution of the radiographic image reader 18.

A sensor (not shown) on the optics module 40 can signal the radiographic image reader 18 to begin data acquisition. When the scanning beam 173 strikes the photoreceptive medium 12, the scanning beam 173 reflect off a beam reflector (not shown) to the sensor. The sensor signals the data acquisition subsystem to begin.

When the scanning beam 173 strikes and penetrates into the photoreceptive medium 12, a charge flow within the photoreceptive medium 12 is initiated. The charge flow is detected as electronic signals representative of the latent image. The electronic signals are transferred from the photoreceptive medium 12 to the data acquisition subsystem. The data acquisition subsystem can then format the electronic signals for immediate use, or can format, transfer, and store the electronic signals onto magnetic media, for later use. Ultimately, the formatted electronics signals can be converted into high resolution visible images representative of the latent image within the photoreceptive medium 12 presentable on a hardcopy.

After the carriage plate 54 has been translated beneath the scanning subsystem such that the photoreceptive medium 12 has been fully scanned, the photoreceptive medium 12 can be reconditioned while the carriage plate 54 is retracted from under the scanning subsystem. The optics module 40 includes a means for reconditioning the photoreceptive medium 12 following the scanning and data acquisition. Reconditioning returns the photoreceptive medium 12 to a condition in which a new latent image can be captured. The reconditioning means can include a light source which is capable of emitting light, having a plurality of electromagnetic frequencies, onto photoreceptive medium 12.

After the carriage plate 54 is retracted from beneath the scanning subsystem, the radiographic image reader 18 can close the openable cover 106 and relatch the cover. The radiographic image reader can also signal the user that the image-reading step C4 is complete and the cassette 10 can be removed from the light-tight enclosure 34.

The Vibration Damping Subsystem

During scanning, vibration of the floor on which the radiographic image reader 18 rests contributes to distortion of the scanning beam 173. As a result, the radiographic image reader 18 includes a vibration damping subsystem, as shown in FIG. 2.

The vibration damping subsystem includes the isolation platform 182 on which the support stand 175 and linear translation stage 174 rest. The isolation platform 182 is thick and relatively heavy, and can, itself, be passively damped by resting on isolation mounts 238. The isolation mounts 238 are made of rubber or a similar damping material, and rest on the support table 32. For still further damping, the support table 32 can be a commercially available air isolation table.

The Environmental Control Subsystem

Controlling the environment within the light-tight enclosure 34 is also an important factor affecting resolution of the image acquired by the radiographic image reader 18. As a result, the environmental control subsystem includes a supply port 242 and exit port 244 as shown in FIG. 2. The supply port 242 is configured to maintain a positive pressure and to exchange the air within light-tight enclosure 34 in a light-tight manner. The supply port 242 includes two intake fans 246 and a particulate filtration system (not shown). The particulate filtration system can be a HEPA-quality system.

The air is directed throughout the light-tight enclosure 34, but is prevented from flowing directly across the photoreceptive medium 12 and the optics module 40, and through the scanning beam 173. Because particulates, such as dust, in these areas can cause artifacts in the image during the acquisition by the radiographic image reader 18, minimizing particulates positively affects the image quality. The air is supplied to a location which substantially shelters the photoreceptive medium 12 and beam path from direct air flow contact.

The environmental control subsystem also transfers excess heat from the light-tight enclosure 34. This minimizes thermal stresses on the components within the light-tight enclosure 34 which can cause distortion of the scanning beam 173.

We claim:

1. A radiographic image reader for acquiring electronic signals corresponding to a latent image of an object produced by radiation exposure of a photoreceptive medium within a cassette, comprising:

a light-tight enclosure with at least one access port for inserting and removing the cassette;

a scanning subsystem mounted within the light-tight enclosure for scanning the photoreceptive medium within the cassette to initiate the acquisition of the electronic signals representative of the latent image; and a cassette registration and interface subsystem within the light-tight enclosure comprising an electronic interface structure for electronically connecting the photoreceptive medium within the cassette to an electronic component external of the cassette to obtain the electronic signals corresponding to the latent image within the photoreceptive medium.

2. The radiographic image reader of claim 1 further comprising a vibration damping subsystem to which the scanning subsystem is mounted.

3. The radiographic image reader of claim 1 in which the electronic component external to the cassette comprises a data acquisition subsystem mounted to the cassette registration and interface subsystem for movement with the cassette as the photoreceptive medium within the cassette is scanned, the data acquisition subsystem being electronically connected to the photoreceptive medium within the cassette for receiving the signals for later use.

4. The radiographic image reader of claim 3 in which the data acquisition subsystem is connected to the cassette by a flexible connector circuit.

5. The radiographic image reader of claim 1 in which the cassette registration and interface subsystem comprises an electrical interface structure for electrically connecting the photoreceptive medium within the cassette to an electrical power source external of the cassette.

6. The radiographic image reader of claim 5 further comprising a power source for providing a selected one of a plurality of voltages to the photoreceptive medium within the cassette.

7. The radiographic image reader of claim 6 in which the power source is within the light-tight enclosure and is movable with the cassette as the photoreceptive medium within the cassette is scanned.

8. The radiographic image reader of claim 6 in which the power source comprises a plurality of power sources arranged so that each power source provides one of the plurality of voltages.

9. The radiographic image reader of claim 1 in which the cassette registration and interface subsystem comprises a cassette registration structure for registering the cassette relative to the scanning subsystem.

10. The radiographic image reader of claim 9 in which the cassette registration and interface subsystem comprises a mechanism for resetting electrical switches on the cassette.

11. The radiographic image reader of claim 9 in which the cassette registration structure comprises:
a carriage plate having a flat surface onto which a cassette is placed;
a three contact registration data point rail for registering the cassette within the cassette registration structure; and
a cassette receiving rail adapted for resiliently biasing the cassette against the registration rail.

12. The radiographic image reader of claim 11 in which the cassette registration structure further comprises biasing means for retaining the cassette against the flat surface of the carriage plate.

13. The radiographic image reader of claim 12 in which the cassette registration structure further comprises a resiliently biased cassette registration lock.

14. The radiographic image reader of claim 1 further comprising a cassette manipulating subsystem capable of configuring the cassette before or after scanning.

15. The radiographic image reader of claim 14 in which the cassette manipulating subsystem comprises an armature having an engagement member for engaging an openable portion of a cassette and a sliding member for accommodating non-concentric axes of rotation of the armature and the openable portion of the cassette.

16. The radiographic image reader of claim 14 in which the cassette comprises a base and an openable cover and the cassette manipulating subsystem comprises:
a plurality of latch engagement pins arranged for selective protrusion from a cassette receiving rail for engagement with a cassette cover latch;
an actuating member connected by at least one cam and one cam follower to the plurality of latch engagement pins;
a first motor for translating the latch engagement pins generally orthogonally to the receiving rail, the first motor being connected by a screw and a nut follower to the actuating member;
a plurality of cover contacting members for positioning the openable cover for unlatching or latching;
a second motor connected to the cover contacting members for rotatably moving the cover contacting members;
a third motor for providing cover opening and closing motion;
an armature having a free end with an engagement member for engaging the openable cover and an attached end which is attached to the third motor;
means for accommodating non-concentric axes of rotation of the armature and the openable cover; and
a plurality of switches electrically connected to the motors for controlling the first, second, and third motors to enable the unlatching, opening, closing, and latching of the openable cover.

17. The radiographic image reader of claim 1 in which the scanning subsystem comprises an optics module which creates a scanning beam.

18. The radiographic image reader of claim 17 in which the optics module comprises a laser scanner which creates a scanning laser beam.

19. The radiographic image reader of claim 17 in which the scanning subsystem comprises a support stand for supporting the optics module.

20. The radiographic image reader of claim 19 further comprising a data acquisition subsystem, wherein the data acquisition subsystem and the cassette registration and interface subsystem move relative to the support stand during scanning of the photoreceptive medium.

21. The radiographic image reader of claim 19 comprising a plurality of kinematic mounts used for mounting the optical module to the support stand to minimize the effect of mechanical distortion of the scanning beam.

22. The radiographic image reader of claim 21 in which the plurality of kinematic mounts comprises a first kinematic mount with one degree of freedom, a second kinematic mount with two degrees of freedom, and a third kinematic mount with three degrees of freedom.

23. The radiographic image reader of claim 1 wherein the scanning subsystem comprises a photoreceptive medium reconditioning means comprising a light source to expose and recondition the photoreceptive medium for subsequent use.

24. The radiographic image reader of claim 23 in which the light source emits a plurality of electromagnetic frequencies.

25. The radiographic image reader of claim 1 in which the photoreceptive medium is a flat plate.

26. The radiographic image reader of claim 1 in which the scanning subsystem comprises a translation stage for moving the cassette relative to the scanning subsystem.

27. The radiographic image reader of claim 1 further comprising an environmental control subsystem for minimizing particulate deposition on the photoreceptive medium and for controlling the air temperature within the light-tight enclosure.

28. The radiographic image reader of claim 27 in which the environmental control subsystem comprises means for creating and maintaining a positive pressure within the enclosure.

29. A radiographic image reader for acquiring electronic signals corresponding to a latent image of an object produced by radiation exposure of a photoreceptive medium within a cassette, comprising:
  a light-tight enclosure with at least one access port for inserting and removing the cassette;
  a scanning subsystem mounted within the light-tight enclosure for scanning the photoreceptive medium within the cassette to initiate the acquisition of the electronic signals representative of the latent image, the scanning subsystem comprising an optics module and a support stand; and
  a cassette registration and interface subsystem within the light-tight enclosure comprising an electronic interface structure for electronically connecting the photoreceptive medium within the cassette to an electronic component external of the cassette to obtain electronic signals corresponding to the latent image within the photoreceptive medium; wherein the cassette registration and interface subsystem is movable beneath a plane of the support stand and the electronic component external of the cassette is moveable adjacent to the plane during scanning of the photoreceptive medium.

30. The radiographic image reader of claim 29 in which the cassette registration and interface subsystem comprises an electrical interface structure for electrically connecting the photoreceptive medium within the cassette to an electrical power source external of the cassette.

31. The radiographic image reader of claim 30 in which the cassette registration and interface subsystem comprises a cassette registration structure for registering the cassette relative to the scanning subsystem.

32. The radiographic image reader of claim 30 further comprising a cassette manipulating subsystem for automatically configuring the cassette before and after scanning.

33. The radiographic image reader of claim 30 further comprising a power source for providing a selected one of a plurality of voltages to the photoreceptive medium within the cassette.

34. The radiographic image reader of claim 33 in which the power source is within the light-tight enclosure and is movable with the cassette as the photoreceptive medium within the cassette is scanned.

35. The radiographic image reader of claim 33 in which the power source comprises a plurality of power sources arranged so that each power source provides one of the plurality of voltages.

36. A radiographic image reader for obtaining a high spatial resolution image by acquiring electronic signals corresponding to a latent image of an object produced by radiation exposure of a photoreceptive medium within a cassette, comprising:
  a light-tight enclosure with at least one access port for inserting and removing the cassette;
  a scanning subsystem mounted within the light-tight enclosure for scanning the photoreceptive medium within the cassette to initiate the acquisition of the electronic signals representative of the latent image, the scanning subsystem comprising an optics module and a support stand, the support stand comprising means for reducing undesired vibration to minimize the effect of distortion on the optical scanning beam; and
  a cassette registration and interface subsystem within the light-tight enclosure comprising:
    an electronic interface structure for electronically connecting the photoreceptive medium within the cassette to an electronic component external of the cassette to obtain electronic signals corresponding to the latent image within the photoreceptive medium; and
    an electrical interface structure for electrically connecting the photoreceptive medium within the cassette to an electrical power source external of the cassette;
  wherein the cassette registration and interface subsystem is movable beneath a plane of the support stand and the electronic component external of the cassette and the power source is movable beneath the plane during scanning of the photoreceptive medium.

37. The radiographic image reader of claim 36 in which the cassette registration and interface subsystem comprises a cassette registration structure for registering the cassette relative to the scanning subsystem.

38. The radiographic image reader of claim 36 further comprising a cassette manipulating subsystem for automatically configuring the cassette before and after scanning.

39. The radiographic image reader of claim 36 in which the power source comprises a plurality of power sources.

40. A method for obtaining a high resolution image from acquisition of electronic signals corresponding to a latent image of an object produced by radiation exposure of a photoreceptive medium within a cassette in a radiographic image reader, comprising:
  providing a light-tight enclosure with at least one access port for inserting the cassette;
  configuring a scanning subsystem mounted within the light-tight enclosure for scanning the photoreceptive medium within the cassette to initiate the acquisition of the electronic signals representative of the latent image; and
  enabling a cassette registration and interface subsystem within the light-tight enclosure to electronically connect the photoreceptive medium within the cassette to an electronic component external of the cassette to obtain a high resolution image from electronic signals corresponding to the latent image within the photoreceptive medium.

41. A method for obtaining a high resolution image from acquisition of electronic signals corresponding to a latent image of an object produced by radiation exposure of a photoreceptive medium within a cassette in a radiographic image reader, comprising:
  providing a light-tight enclosure with at least one access port for inserting the cassette;
  configuring a scanning subsystem mounted within the light-tight enclosure for scanning the photoreceptive medium within the cassette to initiate the acquisition of the electronic signals representative of the latent image, the scanning subsystem comprising an optics module and a support stand, the support stand comprising vibration isolation means for reducing undesired vibration to minimize the effect of mechanical distortion on the scanning subsystem;

providing a cassette registration and interface subsystem within the light-tight enclosure comprising:

an electronic interface structure to electronically connect the photoreceptive medium within the cassette to an electronic component external of the cassette to obtain electronic signals corresponding to the latent image within the photoreceptive medium;

an electrical interface structure for electrically connecting the photoreceptive medium within the cassette to an electrical power source external of the cassette; and connecting the electronic component and the power source to the cassette registration and interface subsystem for movement with the cassette registration and interface subsystem during scanning of the photoreceptive medium.

42. The method of claim 41 further comprising the step of acquiring the signals to produce a high resolution computed image of the latent image.

* * * * *